(12) United States Patent
Atkins, Sr.

(10) Patent No.: US 7,350,483 B2
(45) Date of Patent: Apr. 1, 2008

(54) FLUID PISTON ENGINE

(76) Inventor: Clyde D. Atkins, Sr., 361 Rowe St., Conncaut, OH (US) 44030

( * ) Notice: Subject to any disclaimer, the term of this patent is extended or adjusted under 35 U.S.C. 154(b) by 118 days.

(21) Appl. No.: 11/193,597

(22) Filed: Jul. 29, 2005

(65) Prior Publication Data

US 2007/0107678 A1   May 17, 2007

(51) Int. Cl.
*F02B 75/00* (2006.01)
(52) U.S. Cl. .................................................... 123/19
(58) Field of Classification Search ................. 123/19; 60/39.34
See application file for complete search history.

(56) References Cited

U.S. PATENT DOCUMENTS

| | | | |
|---|---|---|---|
| 41,299 A | 1/1864 | Hugon | |
| 185,709 A | 12/1876 | Wertheim | |
| 192,206 A | 6/1877 | Wertheim | |
| 706,366 A | 8/1902 | Vogt et al. | |
| 781,923 A | 2/1905 | Vogt | |
| 1,000,410 A | 8/1911 | Howell | |
| 1,011,410 A | 12/1911 | Chance et al. | |
| 1,085,865 A | 2/1914 | Humphrey | |
| 2,658,486 A | 11/1953 | De Waide | |
| 3,121,311 A * | 2/1964 | Crosby et al. | 60/39.34 |
| 3,990,228 A * | 11/1976 | Bailey et al. | 123/19 |
| 5,127,369 A | 7/1992 | Goldshtik | |
| 6,182,615 B1 | 2/2001 | Kershaw | |
| 7,191,738 B2 * | 3/2007 | Shkolnik | 123/19 |

* cited by examiner

*Primary Examiner*—Noah P. Kamen
(74) *Attorney, Agent, or Firm*—D.A. Stauffer Patent Services LLC

(57) ABSTRACT

A fluid piston engine with a plurality of cylinders wherein the plurality of cylinders are daisy chained through a single turbine having a single impeller. The fluid piston engine has a plurality of daisy chained cylinders that burn a fuel of hydrogen, and an oxidizer of air, preferably oxygen. A method of operating a fluid piston engine with a plurality of daisy chained cylinders includes steps where the operating controls are triggered by a fluid level sensor in a cylinder. Rather than from the cylinder, combustion byproducts are exhausted through a relief valve on an accumulator. Engine performance is varied by selectively idling cylinders and by varying the relative timing of multiple pairs of cylinders, wherein each pair uses internal combustion to expel fluid out of a first cylinder, through the turbine and into the second cylinder of the pair in which the combustion gases are compressed by the circulating fluid piston.

18 Claims, 11 Drawing Sheets

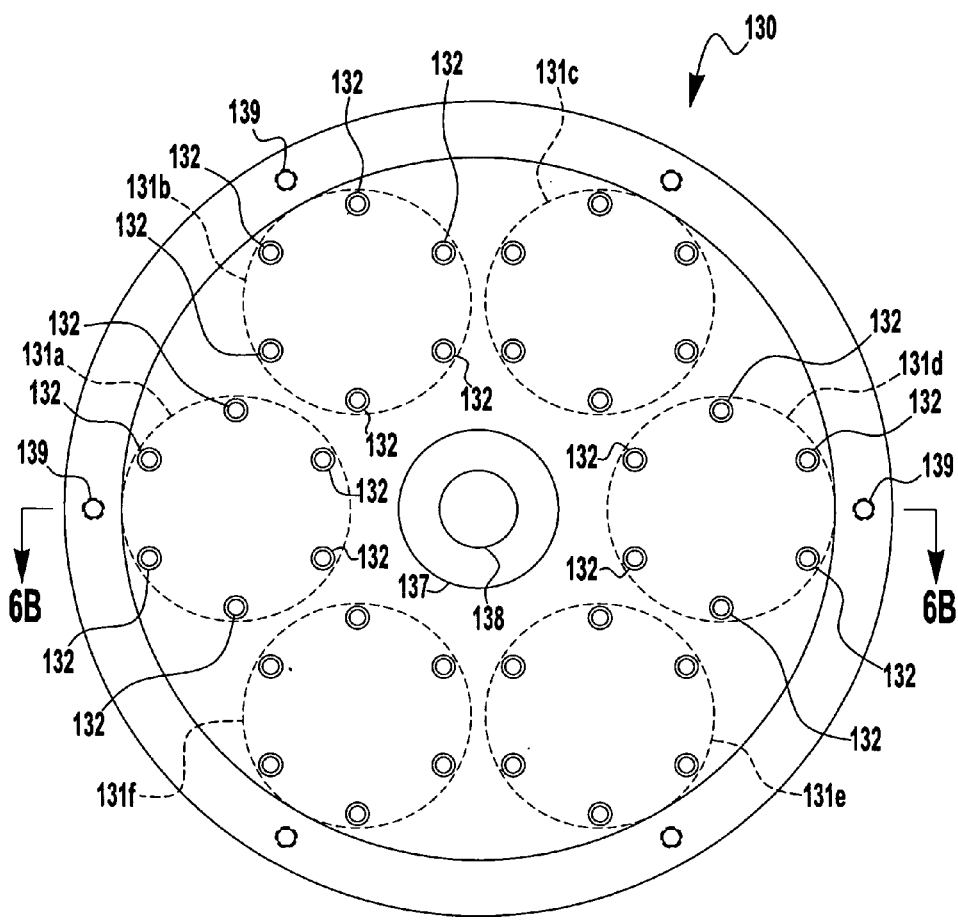
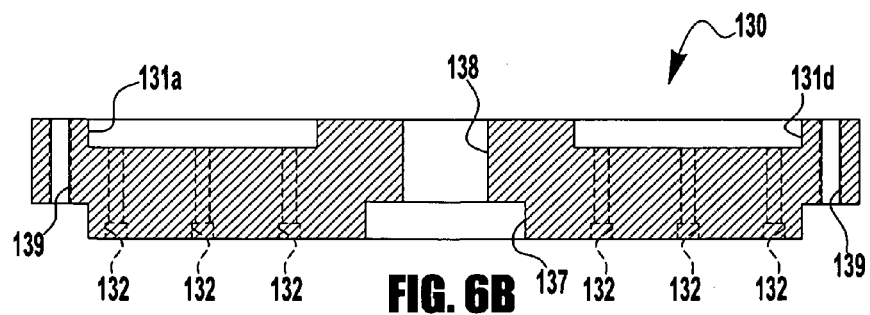

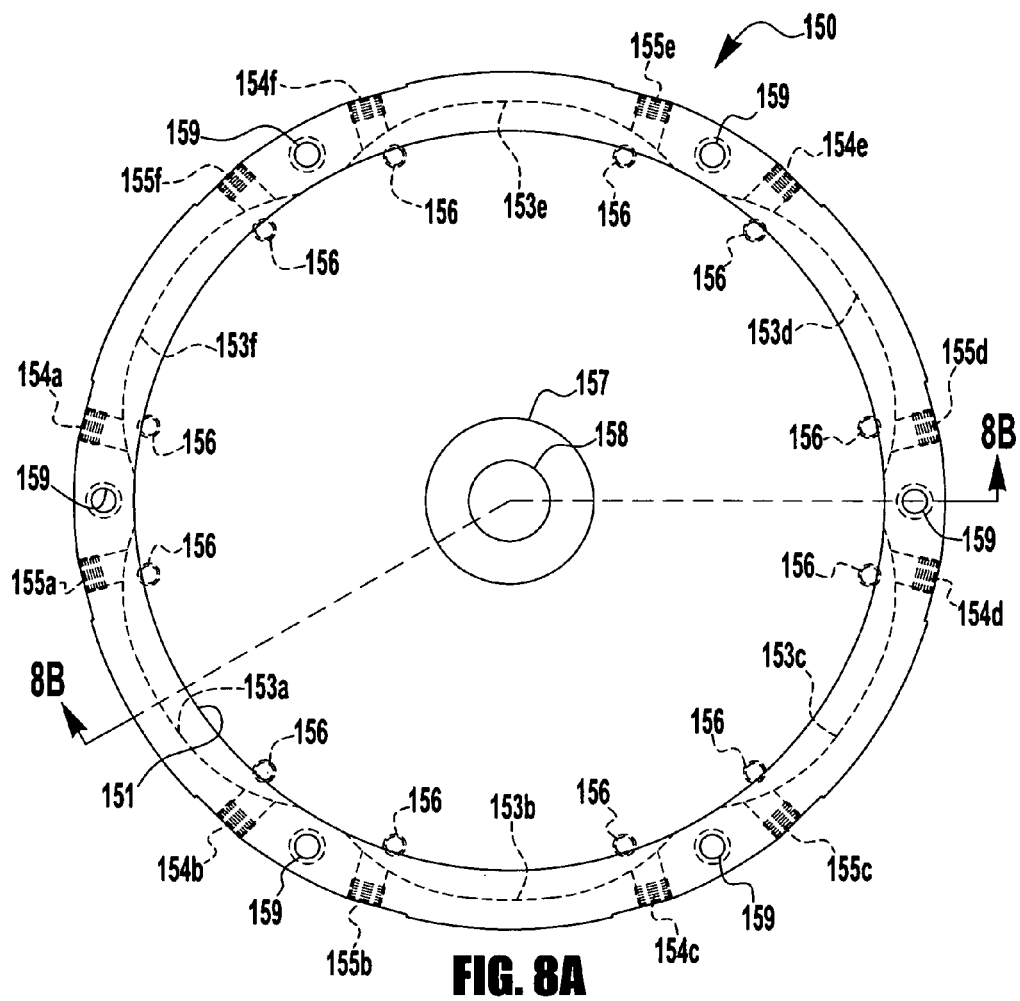
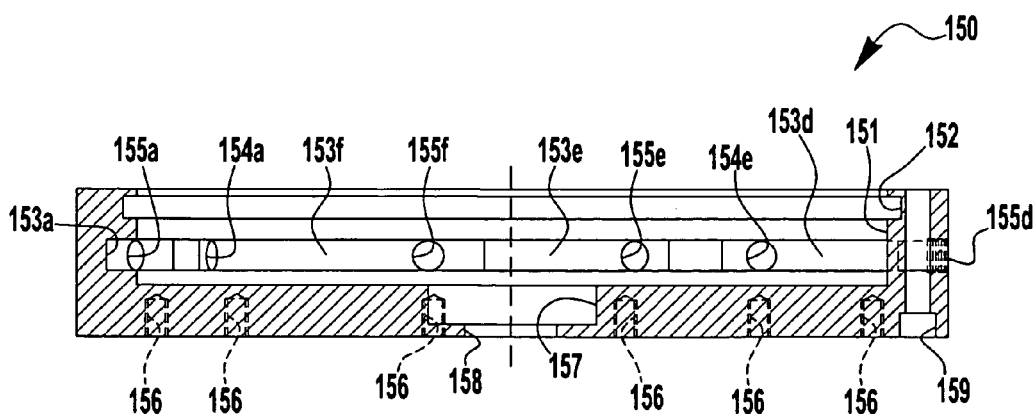

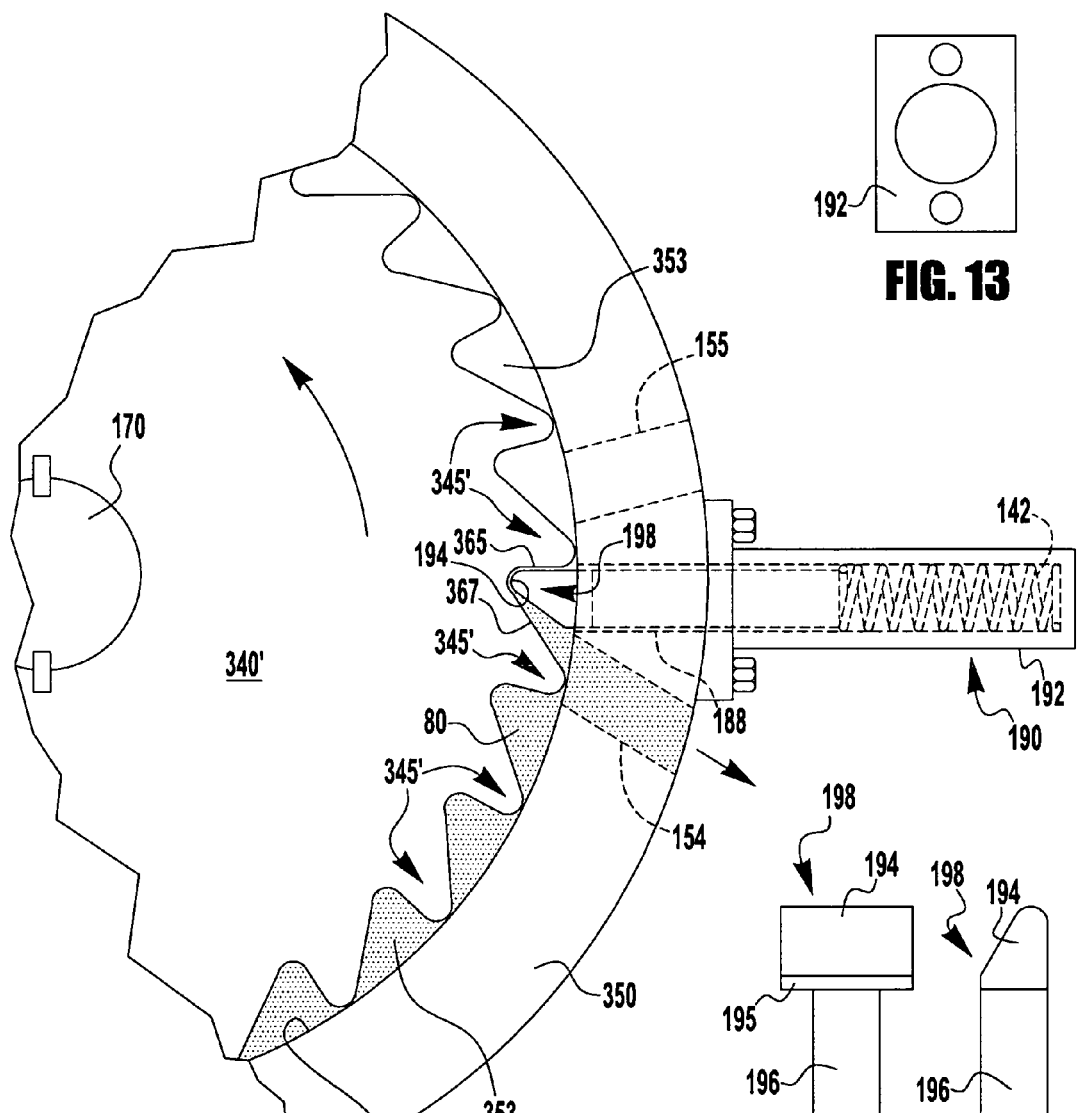
FIG. 13
FIG. 12
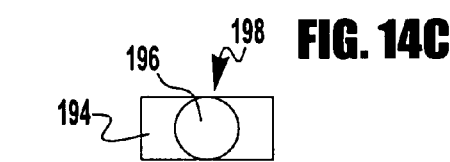
FIG. 14A
FIG. 14C
FIG. 14B

FLUID PISTON ENGINE

TECHNICAL FIELD OF THE INVENTION

The present invention relates to internal combustion engines and, more particularly to those having a fluid piston and a rotary power takeoff.

BACKGROUND OF THE INVENTION

As petroleum products become more expensive and difficult to obtain, and as polluting byproducts of petroleum combustion become more of a concern, there is greatly increased interest in engines that are more energy efficient and that are less polluting than petroleum based combustion engines. The combustion of hydrogen gas ($H_2$) as a fuel with oxygen gas ($O_2$) as the oxidant results in water ($H_2O$) which is not at all polluting, and using ambient air as a source for the oxygen can be made to be minimally polluting if done in a way that minimizes the formation of potential pollutants such as nitrogen oxides.

Internal combustion engines using a liquid (fluid) to transfer the expansion force of exploding gases to a power takeoff have been known in various forms for many years. For example, U.S. Pat. No. 41,299 (Hugon; 1864) discloses a gas engine exploding a "gas source of hydrogen" mixed with air (as a source of oxygen). The explosion acts indirectly on a solid piston through an intermediate column of water.

U.S. Pat. No. 192,206 (Wertheim; 1877) discloses a U-shaped liquid piston "atmospheric gas engine". A single explosion chamber is in a first closed leg of the U, and the second leg serves as a liquid reservoir open to atmospheric pressure. The bottom of the U is a paddle chamber having a paddle that oscillates within it in response to the oscillating movement of the liquid. The oscillating paddle is connected to a continuously rotating shaft through a mechanism to convert the oscillation to unidirectional rotation. Ignition of the gas is by means of a burner. Combustion gases are exhausted through "escape-valves" in the explosion chamber (last sentence of page 1). This patent is said to improve upon a previous patent U.S. Pat. No. 185,709 (Wertheim; 1876) which discloses a turbine valved to rotate in a single direction given oscillatory gas flows.

U.S. Pat. No. 706,366 (Vogt et al.; 1902) discloses an internal combustion motor having one or more cylinders and actuated by any kind of combustible (e.g., coal dust). A preferred embodiment has two cylinders (chambers 5, 6) filled with liquid and having explosions/compressions occurring alternately in the two chambers, thereby pushing back and forth a double-acting solid piston (2) in a cylinder (1) transversely oriented and opening on either side of the piston into a one of the chambers. The shaft (3) of the reciprocating piston is conventionally connected to a crankshaft and flywheel for power takeoff, and to a blower (4) for exhausting combustion gases. (See FIGS. 1 and 5.) There is also a governor (21). Similar engines are disclosed in U.S. Pat. No. 781,923 (Vogt; 1905), and U.S. Pat. No. 1,000,410 (Howell; 1911).

U.S. Pat. No. 1,085,865 (Humphrey; 1914) discloses a method of raising or forcing liquids wherein a reciprocating liquid, one movement or outstroke of it being due to the expansion of a combustible charge in one of a plurality of expansion chambers connected together, utilizing the kinetic energy of return stroke of the liquid to expel burnt products from one chamber and compress a fresh expansible charge in another chamber in the same cycle (claim 1 on page 5), and also to draw in a fresh charge. Using one-way valves on inlets and outlets, the liquid can be pumped.

U.S. Pat. No. 2,658,486 (De Waide; 1953) discloses an engine with a fluid piston interacting with a rotating displacement member (102) while guided by abutment members (104, 105, 121, 122, 125, 126) that seal against the displacement member and cause uni-directional flow of fluid that is oscillating between a pair of chambers (145, 146). The rotating displacement member (102) is cylindrical but mounted eccentrically on the drive shaft (101) conventionally connected to a flywheel (174). See especially FIGS. 1-4 and columns 8-9 of specification. The engine uses "conventional fuel injectors and fuel pumps", and includes cooling of the liquid, liquid-tight seals on moving parts, and scavenging of exhaust gas/fluid.

U.S. Pat. No. 5,127,369 (Goldshtik; 1992) discloses an engine employing rotating liquid as a piston in order to overcome perceived problems with poor stability of the top surface of a flat liquid piston (Background, columns 1-2). Two or more daisy chained cylinders (201, 202) each with a unidirectional outlet tube passing through a hydromotor (205, 206 for power take-off) to an inlet tube of the next cylinder. The inlet and outlet tubes are tangential to the cylinder wall and cause the fluid piston to rotate in a circle around the cylinder wall at high speed and create a vortical liquid body (annulus) with a cylindrical cavity in the middle of the liquid. The cavity is the combustion chamber, and combustion pressure causes the inside diameter of the annulus to increase, thereby forcing liquid out of the outlet tube. The engine can use fuel injectors, diesel or otto cycle, and various fuels. The rotating liquid maintains cool cylinder walls.

U.S. Pat. No. 6,182,615 (Kershaw; 2001) discloses a combustion-driven hydroelectric generating system that has one or more combustion cylinders that contain a liquid and receive a combustible fuel/oxidizer mixture that is ignited and the explosive force pushes liquid into a gas-pressurized vessel, further pressurizing the gas to serve as a driving force for pressurized outlet flow of the liquid, which in turn can be used to operate a water wheel or hydroelectric generator or perform other work. To repeat a cycle, fluid must be pumped back into the combustion cylinder. The claimed embodiment has two combustion cylinders (12) alternately firing, and a two-chamber piston pump (45) for replenishing the fluid in the combustion cylinders. Liquid level sensors (26, 31) are used for control purposes.

BRIEF SUMMARY OF THE INVENTION

It is an object of the present invention to improve upon and to overcome limitations of prior art fluid piston internal combustion engines. For example, a simplified and compact design is desired wherein a plurality of combustion chambers are daisy chained in a way that one or more fluid pistons can be driven from chamber to chamber while passing through dedicated segments of a single rotary power takeoff.

It is a further object of the present invention to utilize a combination of a water piston and hydrogen and oxygen combustion such that an exhaust valve and exhaust cycle are not required in the combustion chambers. Excess fluid and gaseous byproducts of combustion can be vented through pressure relief valves elsewhere in the system, thereby avoiding the need for an exhaust valve in the chamber (one that must resist the high temperatures of the combustion chamber), and also eliminating the need for unproductive exhaust cycles. According to the invention, such a relief valve in place of a combustion chamber exhaust valve can also be used with the inventive fluid piston engine even if the fluid is not water and even if the combustion materials are other than hydrogen and oxygen.

According to the invention, a fluid piston engine with a plurality of cylinders is disclosed wherein the plurality of cylinders are daisy chained through a single turbine having a single impeller.

According to the invention, a method of operating a fluid piston engine with a plurality of daisy chained cylinders is disclosed wherein the operating controls are triggered by a fluid level sensor in the cylinder.

According to the invention, a fluid piston engine with a plurality of daisy chained cylinders is disclosed wherein the fuel is hydrogen gas, and the oxidizer is air. Preferably the air is purified to essentially contain only oxygen.

According to the invention, a fluid piston engine comprises a plurality of combustion cylinders, each having an inlet tube and an outlet tube; one turbine comprising a single disk shaped impeller with a vane extending outward relative to the axial center of the disk, the impeller being rotatably mounted in a turbine housing; a channel inside of the turbine housing positioned for providing a fluid flow path around the radial periphery of the impeller; and a daisy chain connection of the cylinders and the turbine such that a closed fluid flow path exists from the channel through a first inlet tube in to a first cylinder, then out from the first cylinder to the channel through a first outlet tube, then through a portion of the channel and out from the channel through a next, i.e., second inlet tube in to a second cylinder, then out from the second cylinder to the channel through a second outlet tube, then through a portion of the channel and out from the channel through a next inlet tube, the fluid flow path being a daisy chain from the first inlet tube all the way around until the next inlet tube is the first inlet tube.

According to the invention, the channel of the fluid piston engine further comprises: a plurality of lobe shaped channel portions, one channel portion per cylinder, such that a first channel portion provides the fluid flow path through the channel from the first outlet tube to the second inlet tube, and a second channel portion provides the fluid flow path through the channel from the second outlet tube to the next inlet tube; and wherein: the vane is spring biased outward for passing through the plurality of channel portions in sequence as the impeller rotates.

According to the invention, the fluid piston engine further comprises: a squeegee in the turbine housing that is spring biased radially inward; and positioning of the squeegee between the inlet tube and the outlet tube of a cylinder, thereby determining a boundary between two sequential channel portions.

According to the invention, the fluid piston engine further comprises: an accumulator connected to the fluid flow path, wherein the accumulator comprises a gas containing chamber, and a relief valve connected to the chamber. Preferably the engine further comprises a pressure or fluid level sensor connected to the accumulator for measuring the contents therein. Also preferably the accumulator is connected to an inlet tube; and an accumulator shutoff valve controls fluid flow into the accumulator. Preferably the engine further comprises: a first shutoff valve in the inlet tube between the turbine and the accumulator; a second shutoff valve in the inlet tube between the accumulator and the cylinder; and a third shutoff valve in the outlet tube. Further preferably the first shutoff valve is positioned in the connection between the inlet tube and the accumulator. According to the invention, any of the first shutoff valve, the second shutoff valve and the third shutoff valve are flow control shutoff valves.

According to the invention, the fluid piston engine further comprises: a fluid level sensor on each one of the plurality of cylinders, arranged such that the fluid level sensor detects when the fluid reaches a predetermined level in the cylinder.

According to the invention, the fluid piston engine further comprises: a combustion gas inlet into each one of the plurality of cylinders; wherein the only outlet from each one of the plurality of cylinders is the outlet tube.

According to the invention, a method of operating a fluid piston engine with a plurality of daisy chained cylinders, comprises the step of using a fluid level sensor in the cylinder to trigger an engine operating control.

According to the invention, wherein the fluid level sensor in a first cylinder of the plurality of daisy chained cylinders triggers the control when the sensor in the first cylinder detects that fluid has reached a predetermined level in the first cylinder; then further steps of the method after the step of triggering the control comprise the steps of: closing a first cylinder inlet shutoff valve; firing the first cylinder; and opening a first cylinder outlet shutoff valve. Preferably further steps of the method after the step of triggering the control comprise the steps of: for a second cylinder of the plurality of daisy chained cylinders: closing a second cylinder outlet shutoff valve; opening second cylinder fuel and oxidizer inlet valves for a controlled injection time and then closing them; and opening a second cylinder inlet shutoff valve.

According to the invention, the method further comprises the step of opening an accumulator chamber for pressurized filling before the step of opening the second cylinder inlet shutoff valve.

According to the invention, the method further comprises the step of idling a selected cylinder of the plurality of daisy chained cylinders by omitting for the selected idle cylinder all of the previous method steps; determining which one of the plurality of daisy chained cylinders is the second cylinder by implementing in the selected second cylinder the method steps of: closing the second cylinder outlet shutoff valve, opening the second cylinder fuel and oxidizer inlet valves for a controlled injection time and then closing them, and opening the second cylinder inlet shutoff valve; varying engine performance by selecting from the plurality of daisy chained cylinders one or more pairs of sequentially operating first and second cylinders, while idling any remaining ones of the plurality of daisy chained cylinders; and further varying engine performance by varying the timing of the method steps in each pair of sequentially operating first and second cylinders relative to each other pair of sequentially operating first and second cylinders.

According to the invention, the method further comprises the step of controlling fluid flow rates for regulating engine speed.

According to the invention, the method further comprises the step of venting combustion byproducts through a pressure relief valve that is connected to a point in the daisy chain fluid flow path such that the point is between two daisy chained cylinders.

According to the invention, a fluid piston engine comprises a plurality of daisy chained cylinders wherein the fuel is hydrogen, and the oxidizer is air. Preferably the air is purified to substantially contain only oxygen.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Elements of the figures can be numbered such that similar (including identical) elements may be referred to with similar numbers in a single drawing. For example, each of a plurality of elements collectively referred to as 199 may be referred to individually as 199a, 199b, 199c, etc. Or, related but modified elements may have the same number but are distinguished by primes. For example, 109, 109', and 109" are three different elements which are similar or related in some way, but have significant modifications. Such relationships, if any, between similar elements in the same or different figures will become apparent throughout the specification, including, if applicable, in the claims and abstract.

Figure 1:
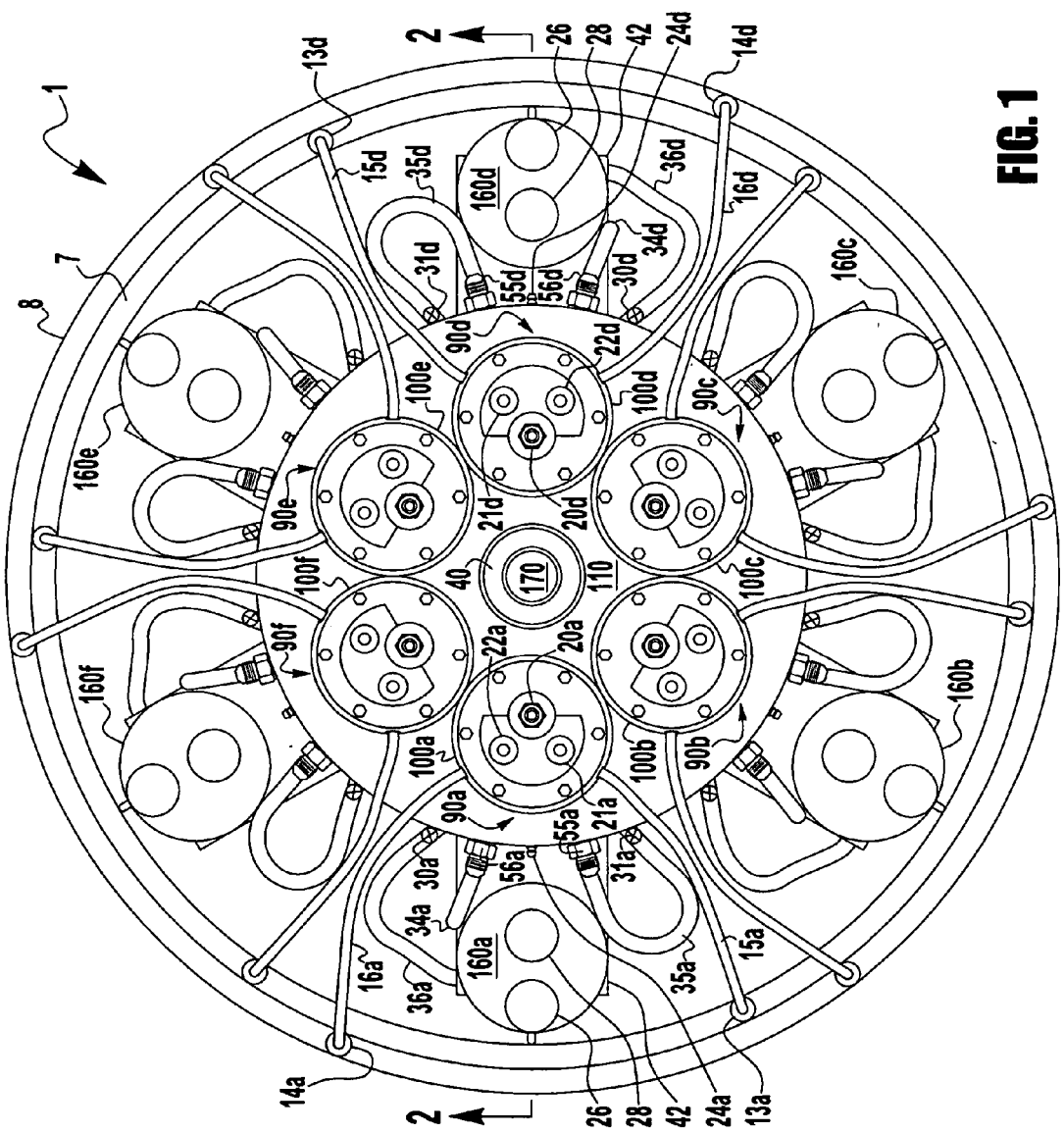
Figure 2:
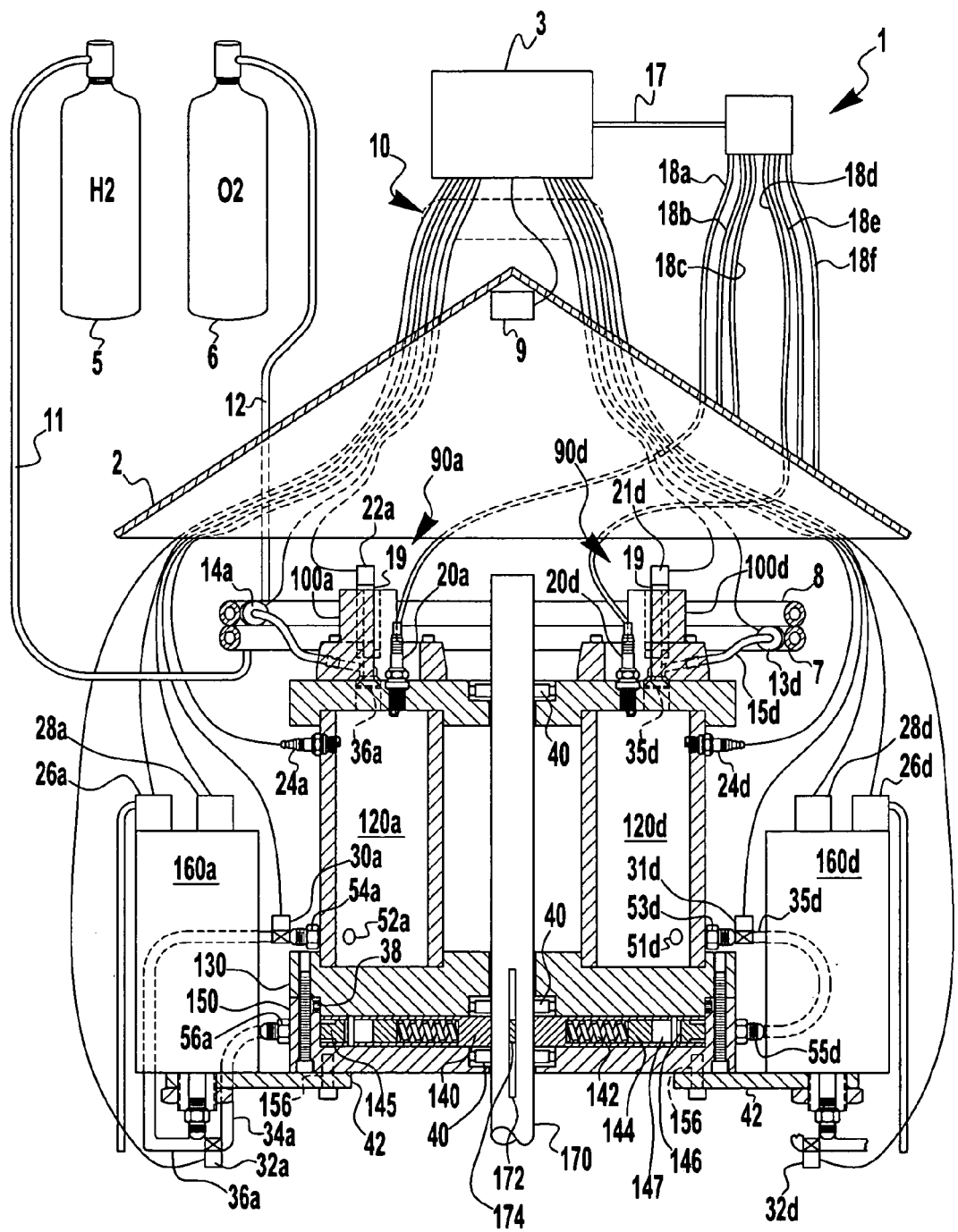
Figure 3A:
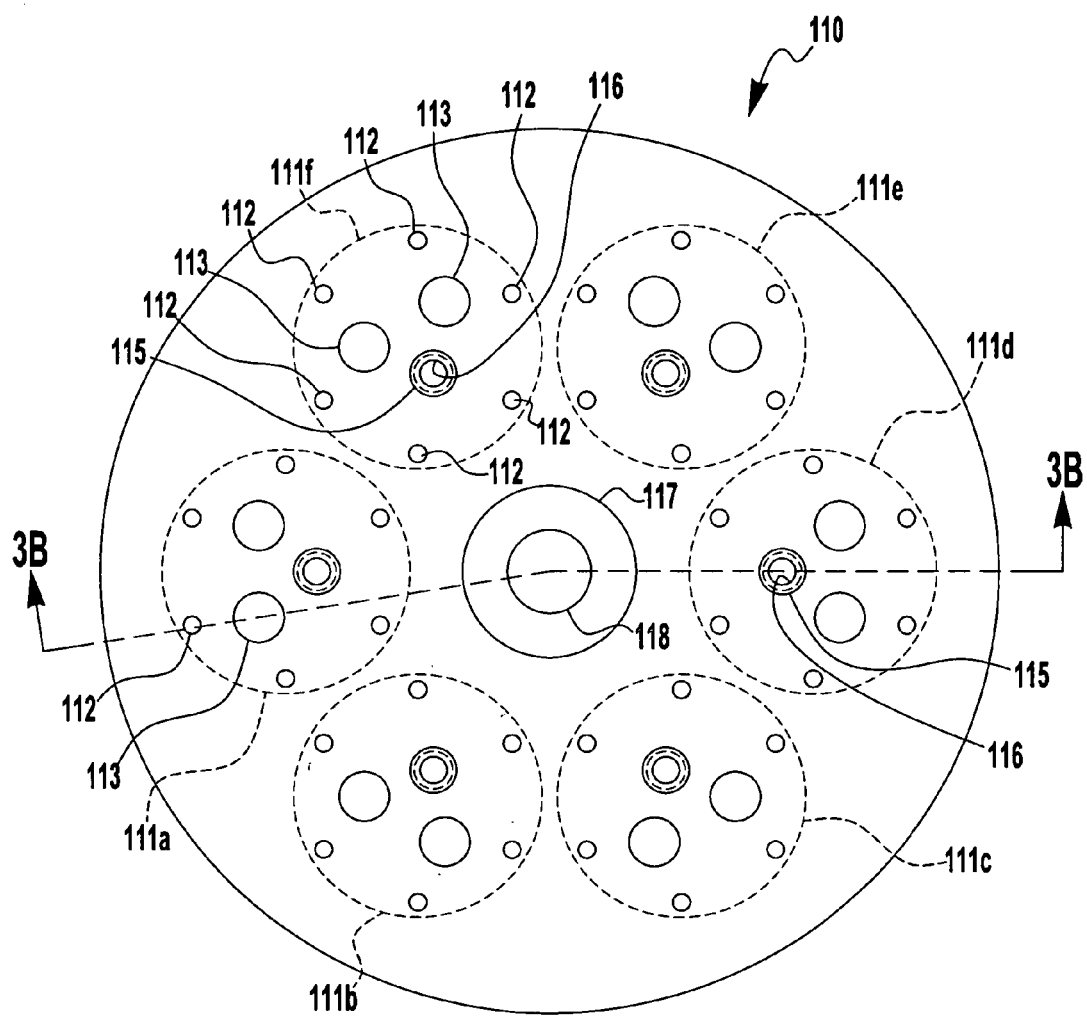
Figure 3B:
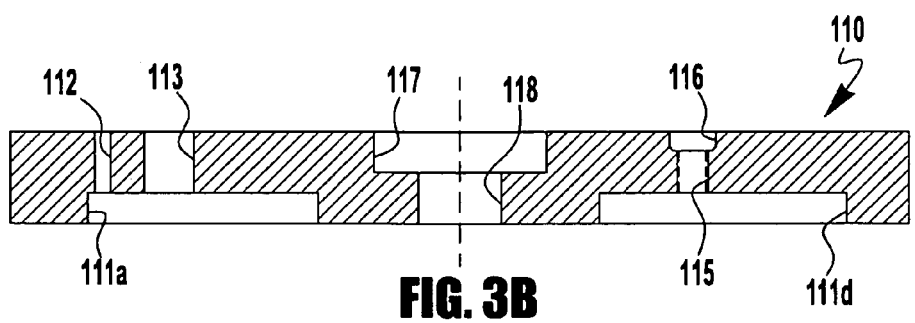
Figure 4A:
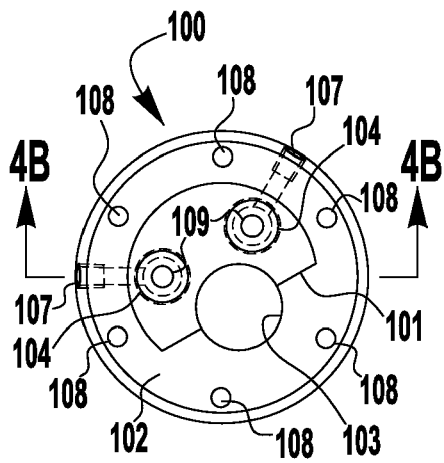
Figure 4B:
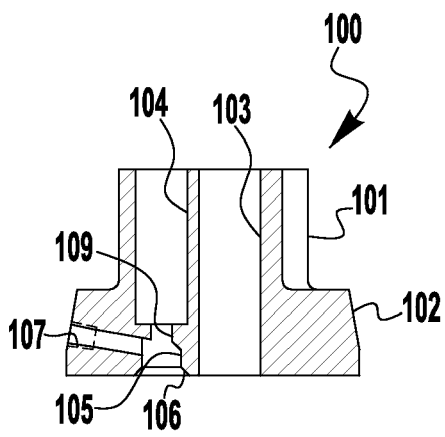
Figure 5A:
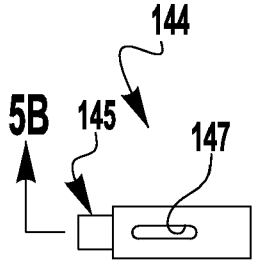
Figure 5B:
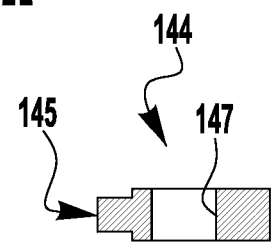
Figure 5C:
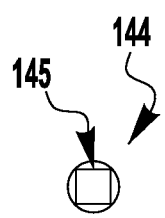
Figure 5D:
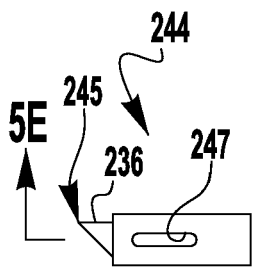
Figure 5E:
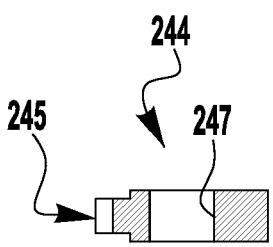
Figure 5F:
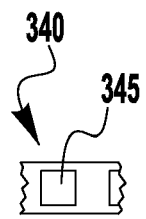
Figure 11:
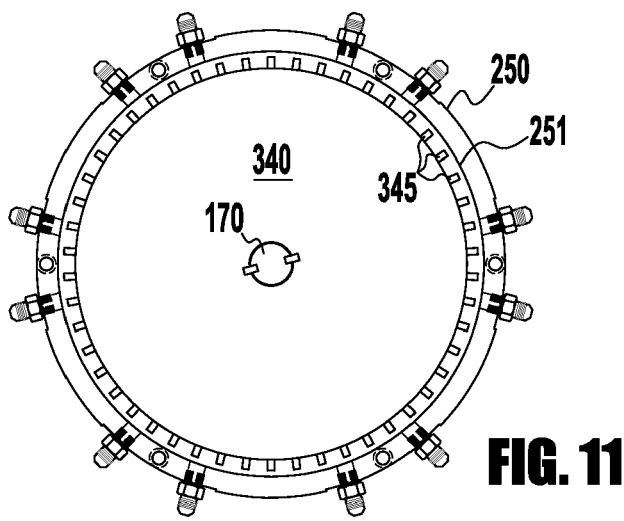
Figure 7A:
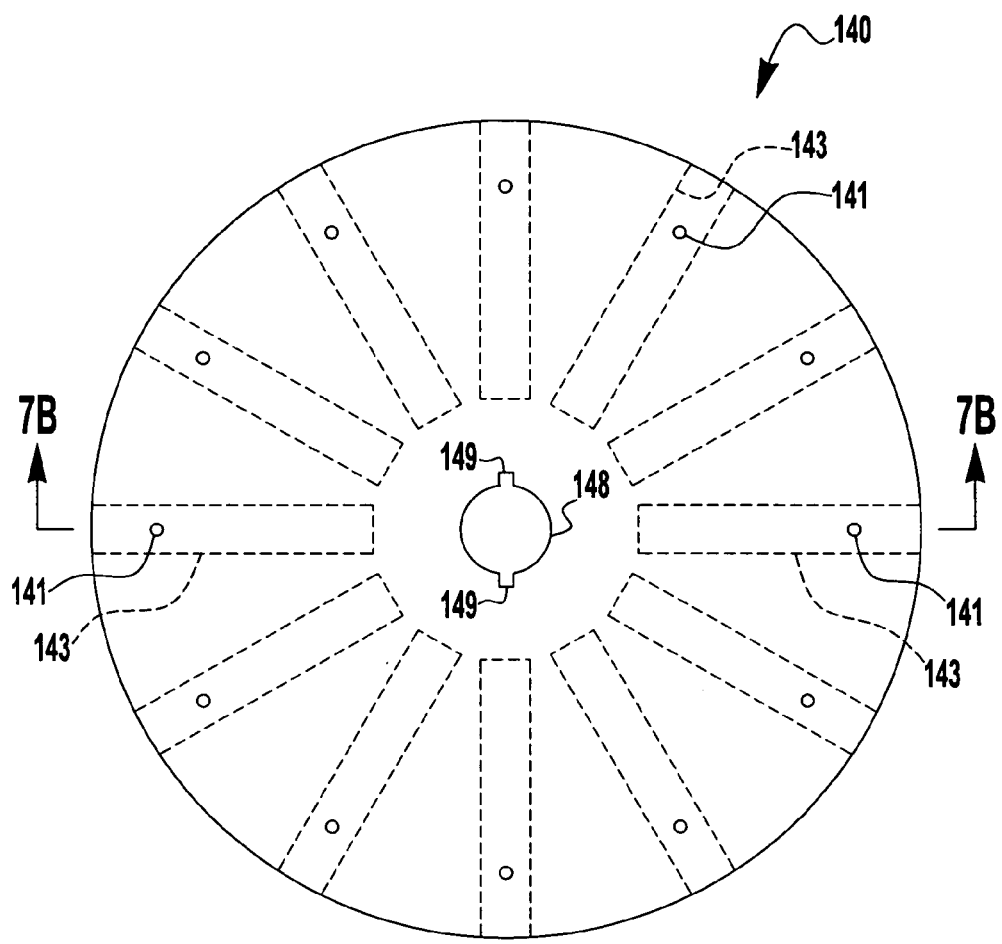
Figure 7B:
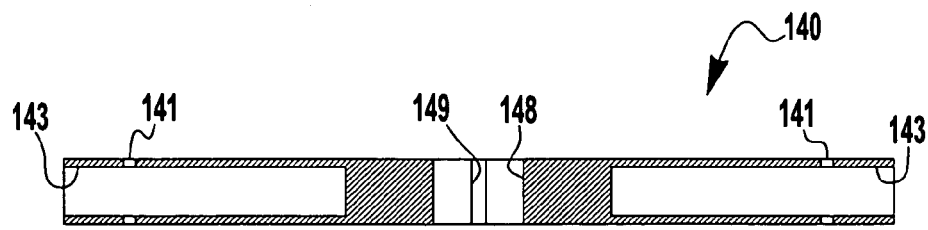
Figure 9A:
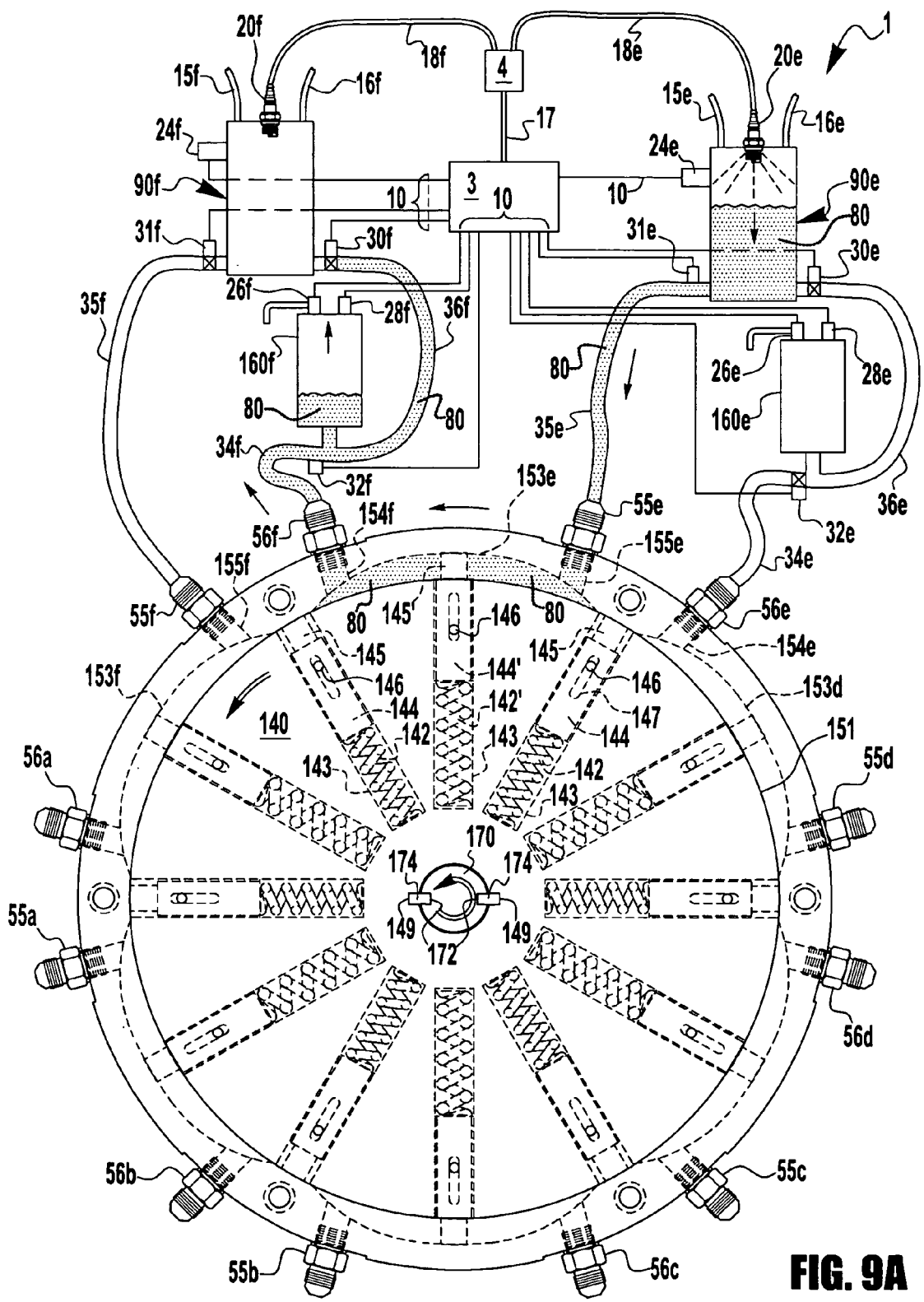
Figure 9B:
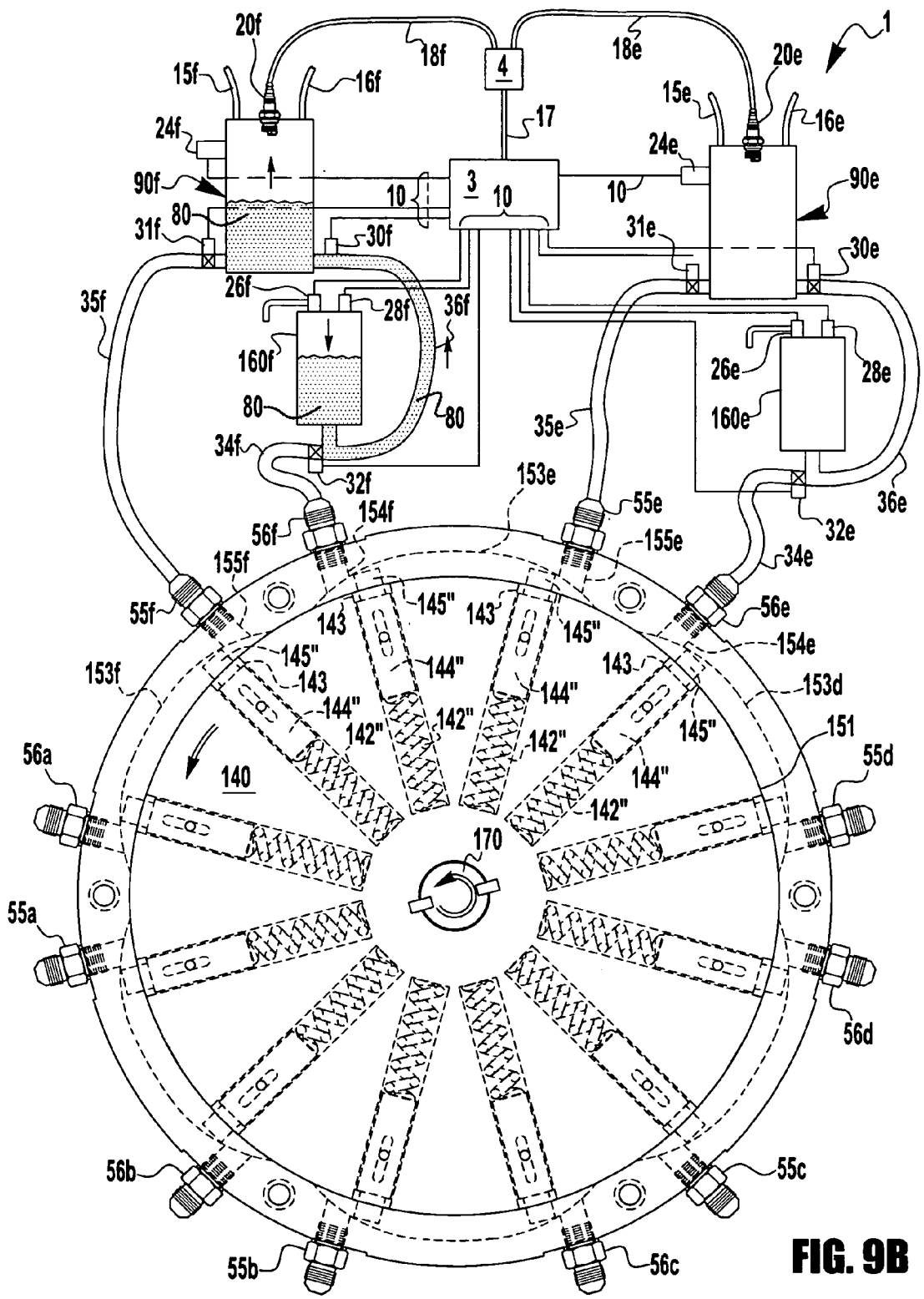
Figure 10:
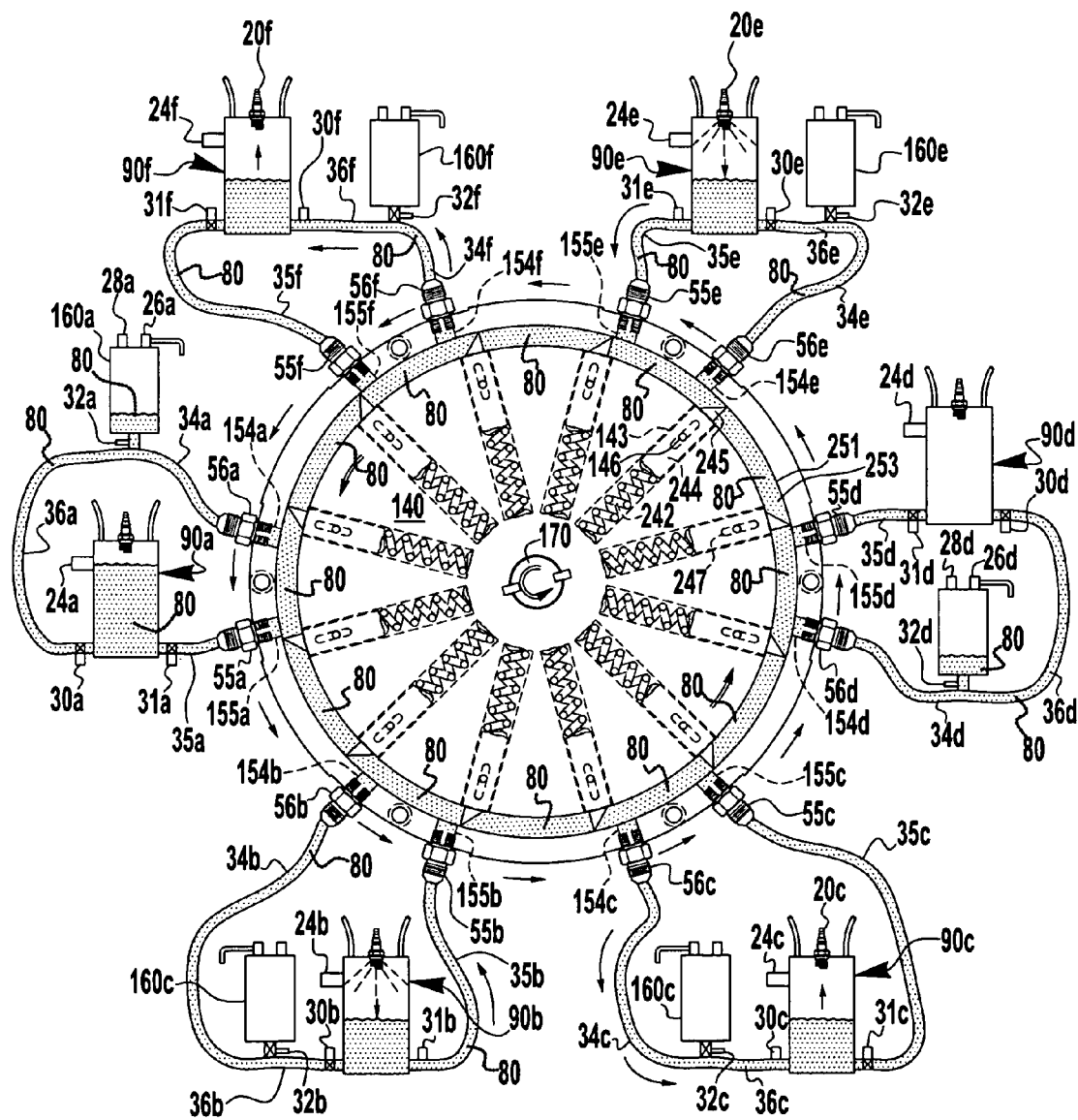

The structure, operation, and advantages of the present preferred embodiment of the invention will become further apparent upon consideration of the following description taken in conjunction with the accompanying drawings, wherein:

FIG. 1 is a top view of a six cylinder embodiment of a fluid piston engine wherein a hood and electrical wires are omitted for clarity, according to the invention;

FIG. 2 is a side cross-sectional view of the fluid piston engine of FIG. 1 including the hood and wires but not showing two rearward cylinders for clarity, the cross-section being taken along the line 2-2 of FIG. 1, according to the invention;

FIGS. 3A and 3B are top and side cross-sectional views, respectively, of a head plate for the fluid piston engine of FIG. 1, the cross-section being taken along the irregular line 3B-3B of FIG. 3A, according to the invention;

FIGS. 4A and 4B are top and side cross-sectional views, respectively, of a valve block for the fluid piston engine of FIG. 1, the cross-section being taken along the line 4B-4B of FIG. 4A, according to the invention;

FIGS. 5A, 5B and 5C are top, side cross-sectional, and end views, respectively, of a first embodiment of a plunger for the fluid piston engine of FIG. 1, the cross-section being taken along the line 5B-5B of FIG. 5A, according to the invention;

FIGS. 5D and 5E are top and side cross-sectional views, respectively, of a second embodiment of a plunger for the fluid piston engine of FIG. 1, the cross-section being taken along the line 5E-5E of FIG. 5D, according to the invention;

FIG. 5F is an edge/end view of a fixed box vane on a fixed-vane impeller, according to the invention;

FIGS. 6A and 6B are bottom and side cross-sectional views, respectively, of a base plate for the fluid piston engine of FIG. 1, the cross-section being taken along the line 6B-6B of FIG. 6A, according to the invention;

FIGS. 7A and 7B are top and side cross-sectional views, respectively, of an impeller disc for the fluid piston engine of FIG. 1, the cross-section being taken along the line 7B-7B of FIG. 7A, according to the invention;

FIGS. 8A and 8B are top and side cross-sectional views, respectively, of a turbine housing for the fluid piston engine of FIG. 1, the cross-section being taken along the irregular line 8B-8B of FIG. 8A, according to the invention;

FIG. 9A is a top view of the turbine housing assembled together with the impeller disc and 12 box-vane plungers, plus a schematic representation of two engine cylinders in use for an operational example, according to the invention;

FIG. 9B is the view of FIG. 9A, but at a different stage of engine operation, all according to the invention;

FIG. 10 is a top view of another embodiment of the turbine housing assembled together with the impeller and twelve of a second embodiment of the plungers, plus a schematic representation of six engine cylinders in use for an operational example, according to the invention;

FIG. 11 is a top view of the turbine housing of FIG. 10 assembled together with the fixed-vane impeller embodiment of FIG. 5F, according to the invention;

FIG. 12 is a top view of a portion of another embodiment of the turbine housing assembled together with a slanted fixed-vane impeller and a squeegee assembly, according to the invention;

FIG. 13 is an end view of a squeegee housing of the squeegee assembly of FIG. 12, according to the invention; and FIGS. 14A, 14B, and 14C are a side, edge, and bottom view, respectively, of a squeegee plunger of the squeegee assembly of FIG. 12, according to the invention.

DETAILED DESCRIPTION OF THE INVENTION

Although the inventive aspects and principles of the fluid piston engine of the present invention can be practiced with any practical quantity of one or more cylinders, the forgoing detailed description will refer primarily to a six-cylinder fluid piston engine, which is a preferred embodiment. Furthermore, the preferred embodiment uses hydrogen gas as a fuel and oxygen gas as an oxidizer, however the practice of the present invention is not limited to this fuel and oxidizer. For example, the fuel could be methane, and the oxidizer could be ambient air.

FIGS. 1 and 2 show a preferred embodiment of an inventive fluid piston engine 1. It may be noted that the drawings are composites of realistically drawn elements (e.g., a spark plug 20a) and representatively or schematically drawn elements (e.g., a valve 30a).

An optional safety element, particularly when the engine 1 is used indoors with hydrogen fuel, is a hood 2 (shown as an inverted cone) with a hydrogen "sniffer" or other suitable gas detector 9. A hydrogen fuel tank 5 is connected by a suitable pipe or fuel line 11 to a fuel manifold 7, and an oxygen oxidizer tank 6 is connected by a: suitable oxidizer line 12 to an oxidizer manifold 8. A controller 3 is connected by way of signal lines 10 to various sensors, valves and/or actuators that comprise the control system for the engine 1. The signal lines 10 comprise electric wires and/or pneumatic air control lines (hoses). An ignition control cable 17 also extends between the controller 3 and an ignition coil 4. From the ignition coil 4, ignition wires 18 extend to spark plugs 20. For example, a first ignition wire 18a is shown extending to a first spark plug 20a and a fourth ignition wire 18d is shown extending to a fourth spark plug 20d (only two of six cylinders 90 of the engine 1 are visible in FIG. 2). At least one ground wire is assumed but not shown.

The engine 1 comprises six cylinders 90 (see FIG. 1) that are labeled such that parts associated with the first one of the cylinders 90 generally have reference numbers ending in the letter "a" (e.g., first cylinder 90a), parts associated with the second one of the cylinders 90 have reference numbers ending in the letter "b" (e.g., second cylinder 90b), and so on through to parts associated with the sixth one of the cylinders 90 that generally have reference numbers ending in the letter "f" (e.g., sixth cylinder 90f). In order to obtain a compact, simple, lightweight, and efficient engine construction the cylinders 90, the manifolds 7, 8, and parts associated with the cylinders 90 are arranged in a tight circle (minimizing the outside diameter). Furthermore, a turbine 180 (for power takeoff) forms the base of the tight circle, and a turbine shaft 170 is at the center of the tight circle.

Each of the cylinders 90 is topped by a valve block 100 (collectively referring to a first valve block 100a on the first cylinder 90a, through a sixth valve block 100f on the sixth cylinder 90f). Each valve block 100 has a fuel valve actuator 21 sealed on top of the valve block 100 by a seal 19 (e.g., a diaphragm) and operationally connected through the seal 19 to a fuel inlet valve 45. Each valve block 100 also has an oxidizer valve actuator 22 sealed on top of the valve block 100 by a seal 19 (e.g., a diaphragm) and operationally connected through the seal 19 to an oxidizer inlet valve 46. For safety reasons, the fuel valve actuators 21 and the oxidizer valve actuators 22 are preferably pneumatically operated by the controller 3. Furthermore, each valve block 100 has a fuel injection line 15 extending from it to the fuel manifold 7, such that each fuel injection line 15 is controlled by a fuel injector control valve 13, preferably pneumatically operated. Each valve block 100 also has an oxidizer injection line 16 extending from it to the oxidizer manifold 8, such that each oxidizer injection line 16 is controlled by an oxidizer injector control valve 14, preferably pneumatically operated.

FIGS. 4A and 4B show more details of the valve block 100, which comprises a header 101 extending up from a footer 102. An injection line mounting hole 107 (e.g., threaded and suitably gasketed) is provided for the fuel injection line 15 and the oxidizer injection line 16. Each injection line mounting hole 107 leads to an inlet chamber 105, which in turn has a valve stem guide hole 109 above it and a valve seat 106 below it. The fuel and oxidizer inlet valves 45, 46 slidably mount in the valve stem guide hole 109 and sealingly seat in the valve seat 106. A valve stem access hole 104 is provided for sealingly mounting the valve stem seal 19 and the appropriate fuel or oxidizer valve actuator 21, 22. A spark plug access hole 103 is provided to allow the spark plug 20 to pass through the valve block 100. Block attachment holes 108 are provided around the footer 102 and are positioned for lining up with the top edge of a cylinder wall 120 such that screws can pass through the block attachment holes 108, through a head plate 110 and be screwed into the top edge of the cylinder wall 120. Thus the valve block 100, the head plate 110, and the cylinder wall 120 are all properly aligned to form a cylinder 90, and also the two valve seats 106 and the spark plug access hole 103 are also aligned with corresponding holes in the head plate 110 for accessing the inside of the cylinder 90.

Additionally referring to FIGS. 3A and 3B, the head plate 110 is a circular plate having a cylinder recess 111 for each of the six cylinder walls 120 (e.g., the first cylinder wall 120a and the fourth cylinder wall 120d as shown in FIG. 2). The head plate 110 thus determines the arrangement of engine cylinders 90. Each cylinder recess 111 has cylinder attachment screw holes 112 that line up with corresponding block attachment screw holes 108 and corresponding threaded holes (not shown) in the cylinder wall 120 which fits into the cylinder recess 111 (e.g., wall 120a in recess 111a for cylinder 90a). Even if not illustrated, suitable seals/gaskets according to known practice are assumed to be mounted as needed between engine parts that need to be sealed (e.g., between the head plate 110 and the cylinder wall 120). Fuel/oxidizer inlet holes 113 and a threaded spark plug mounting hole 116 pass through the head plate 110 to the cylinder interior such that a valve block 100 (e.g., 100a) properly assembled with the head plate 110 and a corresponding cylinder wall 120 (e.g., 120a) using screws that pass through the attachment screw holes 108 and 112 as described will align the spark plug access hole 103 with the spark plug mounting hole 116 to allow screwing a spark plug 20 (e.g., 20a) into place, and will also align the valve seats 106 with the fuel/oxidizer inlet holes 113 to allow the fuel inlet valve (e.g., 45d) and the oxidizer inlet valve (e.g., 46a) to allow inlet valve operation and passage of fuel and oxidizer into the cylinder (e.g., 90a, 90d). The spark plug mounting hole 116 has a spark plug gasket recess 115. In the center of the head plate 110 a shaft hole 118 and a concentric bearing recess 117 provide a place to rotatingly attach a turbine shaft 170 to the engine 1 with a bearing 40 (e.g., a roller bearing).

A vertical cross-section of two of the six cylinder walls 120 (an inlet half of a first cylinder wall 120a, and an outlet half of a fourth cylinder wall 120d) are shown in FIG. 2. Each cylinder wall 120 has a cylinder inlet port 52 (e.g., 52a) and a cylinder outlet port 51 (e.g., 51d), each of which is shown as being suitable (e.g., screw threaded) for sealingly mounting a cylinder inlet tubing connector 54 (e.g., 54a) and a cylinder outlet tubing connector 53 (e.g., 53d), respectively. Provisions are made for attaching a cylinder fluid level sensor 24 (e.g., 24a, 24d) at a predetermined vertical location. This sensor 24 is used to determine when the fluid in a cylinder 90 reaches a predetermined level. A spark plug is shown passing through a suitable spark plug mounting hole and can be used to detect when the fluid rises enough to short out the electrodes of the spark plug, thereby grounding the signal line 10 from the sensor 24 to the controller 3. Of course functionally equivalent fluid level sensors 24 can be substituted, for example a pressure sensor mounted anywhere in the cylinder 90; or for example an ultrasonic sensor that may not require a hole in the cylinder wall 120. For optimum performance of the fluid piston engine 1, the cylinder fluid level sensor 24 should reliably, repeatedly and reasonably accurately detect when the fluid in the cylinder 90 reaches the predetermined level.

To complete the sealed assembly of the six engine cylinders 90, a base plate 130 (see FIGS. 6A and 6B) is screwed to the bottom edge of the cylinder walls 120 using screws that pass through cylinder attachment screw holes 132. The outside (bottom) of the base plate has recesses for the cylinder attachment screw heads in order to avoid interfering with the operation of the turbine 180 which is mounted directly beneath the base plate 130. The base plate 130 is a circular plate having a cylinder recess 131 for each of the six cylinder walls 120 (e.g., the first cylinder wall 120a and the fourth cylinder wall 120d as shown in FIG. 2). The cylinder recesses 131 are positioned to match the arrangement of engine cylinders 90 as determined by the head plate 110. Each cylinder recess 131 has cylinder attachment screw holes 112 that line up with corresponding threaded holes (not shown) in the cylinder wall 120 which sealingly fits into the cylinder recess 131 (e.g., wall 120a in recess 131a for the first cylinder 90a). In the center of the base plate 130 a shaft hole 138 and a concentric bearing recess 137 provide a place to rotatingly attach the turbine shaft 170 to the engine 1 with a bearing 40 (e.g., a roller bearing). The bearing 40 may also be combined with, or incorporate a suitable fluid seal (not shown) on the side facing the turbine 180. The circumferential periphery of the base plate is flanged in order to provide a turbine sealing edge 134 that sealingly mates with the turbine 180. Thus the sealed bottom of the engine cylinders 90 is also the sealed top cover of the turbine 180. Threaded turbine closure holes 139 are provided in suitable locations around the periphery of the base plate 130 for the purpose of bolting together the turbine 180.

In addition to the base plate 130, the turbine 180 comprises a box-vane impeller assembly 140 (see FIGS. 9A and 9B) or an alternate wedge-vane impeller assembly 240 (see FIG. 10), and a multi-channel turbine housing 150 (see FIGS. 8A and 8B) or a shared channel turbine housing 250 (see FIG. 10). The basis of the impeller assemblies 140, 240 is an impeller disc 135 illustrated in FIGS. 7A and 7B. The impeller disc 135 has a plurality of plunger recesses 143, each recess 143 designed to house one plunger 144 or 244 (see FIGS. 5A-5E) and a plunger spring 142. Preferably the plunger recesses 143 are uniformly spaced and radially aligned, but do not need to be. In order to be sure that a plunger 144 or 244 in a plunger recess 143 is always located between each turbine inlet 155 and turbine outlet 154, there should be at least one more plunger recess 143 than the number of cylinders 90. In the preferred embodiment, there are twelve plunger recesses 143 in the impeller disc 135, double the quantity of (six) cylinders 90, and the twelve plunger recesses 143 are uniformly spaced and radially aligned. An alignment pin hole 141 cuts vertically through each of the plunger recesses 143, perpendicularly intersecting the centerline of the plunger recess 143, and located at about the same radial distance for each alignment pin hole 141. At the center of the impeller disc there is a vertical turbine shaft mounting hole 148 that closely fits around the turbine shaft 170, and two key slots 149 positioned to align with corresponding key slots 172 in the turbine shaft (see FIG. 2). When assembling the turbine assembly 150, 250, keys 174 are used to mount the impeller disc 135 onto the turbine shaft 170. Other mounting methods can be used as long as the impeller disc 135 is firmly attached to the turbine shaft 170 in a plane normal to the turbine shaft 170 and in a way that is suitably balanced both statically and dynamically at maximum turbine revolution speeds.

Additionally referring to FIGS. 5A-5E, two of many possible alternate embodiments of plungers are illustrated: a box-vane plunger 144, and a wedge-vane plunger 244. The box-vane plunger 144 has a substantially cylindrical body suitable for slidably engaging within the plunger recess 143, and a square ended, box-shaped turbine vane 145 cut into one end. A longitudinally extending diametrical slot is an alignment groove 147 that is in a plane parallel to one pair of sides of the box vane 145. The wedge-vane plunger 244 has a substantially cylindrical body suitable for slidably engaging within the plunger recess 143, and a chisel ended, wedge-shaped turbine vane 245 cut into one end. Preferably, one wedge side is a longitudinally extending wedge side 236. A longitudinally extending diametrical slot is an alignment groove 247 that is in a plane parallel to the longitudinally extending wedge side 236. Another possible alternate embodiment of the plunger (not illustrated) is a variant of the box vane plunger 144 wherein the leading and trailing edges of the turbine vane 145 are rounded or beveled, and between those edges a vertical channel extends top to bottom across the outward face of the vane. This channel is mostly filled with a nylon bearing seat that in turn has a round hole sized to hold a cylindrical roller bearing, e.g., 3/16" diameter by 3/8" long steel roller bearing. The round hole also extends top to bottom and overlaps the outward face of the nylon bearing seat which is flush with the outward face of the vane. Thus an outward portion of the roller bearing is exposed outward of the face of the vane and will roll along a turbine housing as the impeller disc 135 rotates.

To assemble a box-vane impeller assembly 140, a plunger spring 142 is placed into a plunger recess 143 of the impeller disc 135, followed by a box-vane plunger 144 with the box vane 145 extending outward from the plunger recess 143. An alignment pin 146 (e.g., a drive pin) is placed through the alignment pin holes 141 and the alignment groove 147, thereby slidably holding the plunger 144 within the plunger recess 143 but aligning the box vane 145 such that two vane sides are vertical and two vane sides are horizontal (when the impeller disc 135 is in a horizontal plane). This process is repeated for all of the plunger recesses 143. To assemble a wedge-vane impeller assembly 240, an alternate plunger spring 242 is placed into a plunger recess 143 of the impeller disc 135, followed by a wedge-vane plunger 244 with the wedge vane 245 extending outward from the plunger recess 143. An alignment pin 146 (e.g., a drive pin) is placed through the alignment pin holes 141 and the alignment groove 247, thereby slidably holding the plunger 244 within the plunger recess 143 but aligning the wedge vane 245 such that the longitudinally extending wedge side 236 is normal to the plane of the impeller disc 135. Furthermore the longitudinally extending wedge side 236 is oriented to face rearward of the desired rotation direction of the wedge-vane impeller assembly 240. This process is repeated for all of the plunger recesses 143.

FIGS. 8A and 8B show a multi-channel turbine housing 150. FIGS. 9A and 9B show a turbine 180 without the covering base plate 130 and wherein the multi-channel turbine housing 150 is combined with a box-vane impeller assembly 140 and shown in engine operational use at two different impeller rotational angles. FIG. 2 is a cross-sectional view of a fully assembled fluid piston engine 1 (portions schematically represented) wherein the multi-channel turbine housing 150 combined with the box-vane impeller assembly 140 is shown at the same rotational angle as in FIG. 9A. The multi-channel turbine housing 150 has a multi-lobed channel 153 cut radially outward into a circumferential sealing edge 151. It can be seen from FIGS. 9A and 9B that the spring biased plungers 144 cause the vanes 145 to follow along the curved inside surface of the channel 153. The height of the vane 145 is slightly less than the height of the channel 153. Each lobe of the channel 153 forms a channel passing between a turbine inlet port 155 and a turbine outlet port 154, such that a fluid (or gas) 80 that flows into a turbine inlet port 155 and out of a turbine outlet port 154 will flow along the connecting channel 153 and push on any vane 145 that is in that channel 153, thereby rotating the impeller 140 and the attached turbine shaft 170 to create a turbine effect. Thus a first channel 153a passes between a first turbine inlet port 155a and a second turbine outlet port 154b; a second channel 153b passes between a second turbine inlet port 155b and a third turbine outlet port 154d; and so on around to a sixth channel 153f that passes between a sixth turbine inlet port 155f and a first turbine outlet port 154a. In the radial center of the multi-channel turbine housing 150 a turbine shaft hole 158 and a bearing recess 157 are provided for rotatingly securing the turbine shaft 170 in the center of the housing 150, thereby also centering the impeller 140 that is fixedly mounted on the turbine shaft 170. Turbine closure shank holes 159, recessed for bolt heads are provided around the periphery and line up with the turbine closure threaded holes 139 in the base plate 130 so that the turbine can be securely fastened together to form a closed chamber for the impeller 140. The bearing 40 that press-fits in the bearing recess 157 preferably incorporates a fluid-tight seal. An O-ring recess 152 is cut a uniform depth into the circular multi-channel turbine housing sealing edge 151 such that the turbine sealing edge 134 of the base plate 130 will seat down inside the sealing edge 151 to be sealed by an O-ring 38 that is trapped therebetween. Threaded mounting plate screw holes 156 are provided for attaching accumulator mounting plates 42.

In a preferred embodiment of the fluid piston engine 1 as illustrated in FIGS. 1, 2, 9A and 9B, there is an accumulator 160 for each cylinder 90. The accumulator 160 is a hollow inverted chamber initially filled with a gas, typically air, that can be pressurized when fluid is forced into the bottom of the accumulator 160. Alternatively, the pressurizing can be accomplished by forming the chamber within the accumulator 160 out of an expandable resilient diaphragm or bladder (not shown). At the top of the accumulator 160 are a pressure or level sensor 28 and a relief valve 26 (e.g., a first pressure/level sensor 28$a$ and a first relief valve 26$a$ on a first accumulator 160$a$). Both the sensor 28 and the relief valve 26 communicate through signal lines 10 with the controller 3. Thus the relief valve 26 can either tell the controller 3 that it is releasing overpressure in the accumulator 160, or the controller 3 can cause the relief valve 26 to release pressure. The pressure/level sensor 28 is used to communicate to the controller the fluid level and/or pressure in the accumulator 160. There could be more than one relief valve 26 on the accumulator 160, or a single relief valve 26 selected from one of two types, wherein one type of relief valve 26 bleeds excess gas off the top of the chamber and a second type of relief valve 26 is connected further down the chamber for bleeding off excess fluid 80. Alternatively, a single relief valve could be connected part way down the chamber for bleeding off either fluid or gas depending upon which is causing the excess pressure by increased accumulation in the accumulator 160. Excess gas can come from steam or from combustion byproducts (especially if air is the oxidizer), and excess water can come from combustion of hydrogen and oxygen.

The cylinder 90, the accumulator 160 and the turbine 180 are connected by tubing (suitable for the high pressures involved) in a way that establishes paths for fluid 80 to flow from cylinder 90 to cylinder 90 in a daisy chained fluid flow path that passes through the turbine 180 between cylinders 90. FIGS. 1, 2, 9A and 9B illustrate a first preferred embodiment of this flow path that provides flexibility for multiple methods of operating the inventive fluid piston engine 1. A cylinder outlet tube 35 runs between the cylinder outlet port 51 and the turbine inlet 155, connected at each end by a cylinder outlet tubing connector 53 and a turbine inlet tubing connector 55. An outlet valve 31 is in the outlet tube 35 for turning on or off the cylinder outlet fluid flow as controlled by the controller 3 using a signal line 10. The outlet valve 31 is optionally a variable flow shutoff valve to allow control of the flow rate. A cylinder inlet tube 36 runs between the cylinder inlet port 52 and the accumulator 160, connected at the cylinder end by a cylinder inlet tubing connector 54 and at the accumulator 160 by a tee junction that is also connected to the accumulator end of an accumulator tube 34 that then runs to a turbine outlet 154 where it is connected by a turbine outlet tubing connector 56. An inlet valve 30 is in the inlet tube 36 for turning on or off the cylinder inlet fluid flow as controlled by the controller 3 using a signal line 10. The inlet valve 30 is optionally a variable flow shutoff valve to allow control of the flow rate. Also an accumulator valve 32 is in the accumulator tube 34 for turning on or off the turbine outlet fluid flow as controlled by the controller 3 using a signal line 10. The accumulator valve 32 is optionally a variable flow shutoff valve to allow control of the flow rate. This arrangement is duplicated for all six of the cylinders 90$a$-90$f$, and their associated accumulators 160$a$-160$f$.

Due to the daisy chain fluid flow path, the pattern of reference lettering is somewhat interrupted. For example, as illustrated in FIG. 9A, the fifth turbine inlet 155$e$ receives flow from the fifth cylinder 90$e$, and the fifth channel 153$e$ directs the flow through the sixth turbine outlet 155$f$ to the sixth accumulator 160$f$ and the sixth cylinder 90$f$. As an example of engine operation, FIG. 9A illustrates the firing of the fifth cylinder 90$e$ which forces fluid out of the fifth cylinder 90$e$, through the turbine 180 for power takeoff and then towards the next cylinder 90$f$. The operational sequence for a cycle is as follows:

a) Fluid 80 has filled the fifth cylinder 90$e$ to a level that triggers the fifth cylinder fluid level sensor 24$e$ to send a "full" signal to the controller 3.

b) The controller 3 closes the fifth cylinder inlet valve 30$e$, triggers the ignition coil 4 to fire the fifth spark plug 20$e$, and opens the fifth cylinder outlet valve 31$e$.

c) The controller 3 opens the sixth accumulator valve 32$f$ but closes the sixth cylinder inlet valve 30$f$ and the sixth cylinder outlet valve 31$f$.

d) Under pressure of the exploding fuel/oxidizer mixture in the fifth cylinder 90$e$, the fluid flows out of the fifth cylinder 90$e$ and into the sixth accumulator 160$f$.

e) At a predetermined interval after firing the fifth cylinder 90$e$, when the cylinder should be empty, the controller 3 closes the fifth cylinder outlet valve 31$e$, opens the sixth fuel and oxidizer injector control valves 13$f$ and 14$f$ for a controlled injection time, and simultaneously causes the sixth fuel and oxidizer valve actuators 21$f$ and 22$f$ to open the sixth fuel and oxidizer inlet valves 45$f$ and 46$f$, also for a controlled injection time, after which all of the valves 13$f$, 14$f$, 21$f$, 22$f$, 45$f$, and 46$f$ are closed. An alternative method for determining when the fifth cylinder 90$e$ is empty is to use the sixth pressure/level sensor 28$f$ to signal when the sixth accumulator 160$f$ has been filled by the fluid 80 expelled from the fifth cylinder 90$e$.

f) As illustrated in FIG. 9B, the sixth accumulator valve 32$f$ is closed, the sixth cylinder inlet valve 30$f$ is opened, and the fluid 80 fills and pressurizes the fuel/oxidizer mix in the sixth cylinder 90$f$ as it rises toward the sixth cylinder fluid level sensor 24$f$.

g) The cycle repeats when the fluid 80 has filled the sixth cylinder 90$f$ to a level that triggers the sixth cylinder fluid level sensor 24$f$ to send a "full" signal to the controller 3.

When the cycle repeats, the fluid "piston" 80 is forced out of the sixth cylinder 90$f$ and on toward the next cylinder and accumulator, i.e., the first cylinder 90$a$ and accumulator 160$a$. However, the controller may decide to "idle" any cylinder 90, for example the nth cylinder 90$n$ by opening that cylinder's accumulator valve 32$n$, its cylinder inlet valve 30$n$ and its cylinder outlet valve 31$n$, thereby allowing the fluid 80 to simply pass through the cylinder 90$n$ and back into the turbine 180 for passage through the nth channel 153$n$ to the next daisy chained cylinder 90. In this way, all but two of the cylinders 90 could be idled, and the engine would still run, turning the turbine 180 for power takeoff. For additional power, additional cylinders 90 can be activated by the controller 3. Thus, for example, it would be possible to have three pairs of cylinders 90 simultaneously running the operational method detailed above. Furthermore, the three pairs of cylinders 90 could be operating at different steps of the operational method, or the same steps, as desired for optimizing engine operation, power, speed, vibration, etc. For example, every other cylinder could be fired simultaneously, or they could be timed to fire in sequence at equal time intervals.

Thus the inventive fluid piston engine 1 effectively operates its cycle in a pair of cylinders 90, e.g., a "first" cylinder and a "second" cylinder. An explosion (internal combustion) in the first cylinder expels fluid 80 out of the first cylinder, through the turbine 180 (producing power takeoff), and into the second cylinder of the pair in which the combustion gases are compressed by the circulating fluid piston 80. Once the fluid has filled the second cylinder to a desired level (as detected by the fluid level sensor 24, then the second cylinder becomes a new "first cylinder" ready to be fired in a new operating pair that has a new "second cylinder" further along the daisy chained sequence of cylinders 90. If, for example, there are only two cylinders 90, then the "first" and "second" cylinder identifications alternate at the conclusion of each operational cycle. Because of the accumulators 160, it is even possible to have two cycles going on simultaneously (even asynchronously) in only two cylinders 90, since the expelled fluid 80 can go into an accumulator 160 before going into the next cylinder 90.

During operation, the burning of hydrogen and oxygen will produce water which will add to the volume of fluid 80 in the fluid piston(s). Excess fluid, and/or any exhaust gases are all combustion byproducts that accumulate in the closed system and can be vented by the relief valves 26. This avoids the need for an exhaust valve in the cylinder 90 (one that must resist the high temperatures of a combustion chamber), and also eliminates the need for unproductive exhaust cycles.

FIG. 10 illustrates a related operating method that is made possible by certain changes in dimensions and placement of parts. First of all, a wedge-vane plunger 244 is illustrated in use. The shape of the wedge vane 245 enables it to "ride over" a stagnant pocket of gas or fluid 80, such as may occur in an unused channel 153 of the multi-channel turbine housing 150, thus not retarding the turning of the impeller 140 in the turbine 180. Secondly, and not necessarily related to the wedge-vane plunger 244, the turbine housing illustrated in FIG. 10 is a shared channel turbine housing 250, wherein a single channel 253 is a continuous ring around the radial periphery of the impeller (e.g., 140) that is shared by all of the cylinders 90. The plungers (e.g., 244 or 144) can follow the single channel 253 around without moving in and out, and therefore an impeller 340 with fixed vanes 345 can be used. As illustrated in FIG. 5F and FIG. 11, the fixed vanes 345 can be dimensioned such that they don't extend radially outward all the way to the channel wall 251. That way, the fixed-vane impeller 340 will be dragged along by moving fluid 80 but not impeded by stagnant pockets. Of course, in a single channel 253, there shouldn't be any pockets in which there can be stagnant fluid 80. Another way to view this is to see that as fluid 80 flows through the single channel 253 from any turbine inlet 155 to any turbine outlet 154, the fixed-vane impeller 340 will be dragged along by the moving fluid 80 passing nearby the fixed vanes 345.

Whereas the single channel 253 is a continuous ring, the multiple channels 153 of the multi-channel turbine housing 150 can be seen as sequential segments or portions of the ring-like channel 253, i.e., channel portions 153.

The shared channel turbine housing 250 illustrated in FIG. 10 allows further operational possibilities, including running the fluid piston cycle between any two cylinders 90, regardless of their position in the daisy chain sequence. A further change wherein the accumulator valve 32 is mounted over the entrance to the accumulator 160 allows a number of cycle variations. For example, the operational sequence for a cycle is as follows:

a) In FIG. 10, fluid 80 has filled the fifth cylinder 90*e* to a level that triggers the fifth cylinder fluid level sensor 24*e* to send a "full" signal to the controller 3.

b) The controller 3 closes the fifth cylinder inlet valve 30*e*, triggers the ignition coil 4 to fire the fifth spark plug 20*e*, and opens the fifth cylinder outlet valve 31*e*.

c) The controller 3 does not open the sixth accumulator valve 32*f*, but opens the sixth cylinder inlet valve 30*f* and keeps the sixth cylinder outlet valve 31*f* closed.

d) Under pressure of the exploding fuel/oxidizer mixture in the fifth cylinder 90*e*, the fluid 80 flows out of the fifth cylinder 90*e* and into the sixth cylinder 90*f*, pressurizing the fuel/oxidizer mix in the sixth cylinder 90*f* as it rises toward the sixth cylinder fluid level sensor 24*f*.

e) When the fluid 80 has filled the sixth cylinder 90*f* to a level that triggers the sixth cylinder fluid level sensor 24*f* to send a "full" signal to the controller 3, the controller closes the fifth cylinder outlet valve 31*e*, opens the fifth fuel and oxidizer injector control valves 13*e* and 14*e* for a controlled injection time, and simultaneously causes the fifth fuel and oxidizer valve actuators 21*e* and 22*e* to open the fifth fuel and oxidizer inlet valves 45*e* and 46*e*, also for a controlled injection time, after which all of the valves 13*e*, 14*e*, 21*e*, 22*e*, 45*e*, and 46*e* are closed.

f) The controller 3 closes the sixth cylinder inlet valve 30*f*, triggers the ignition coil 4 to fire the sixth spark plug 20*f*, and opens the sixth cylinder outlet valve 31*e*.

g) The controller 3 opens the fifth cylinder inlet valve 30*e* to allow the fluid piston 80 to flow from the sixth cylinder 90*f* through the shared channel 253 to turn the turbine 180 and into the fifth cylinder 90*e*, and the cycle repeats.

Other cylinders 90 can be idled simply by closing their inlet and outlet control valves 30 and 31. Optionally any of the accumulators 160 can be opened by their accumulator valve 32 for accumulating excess fluid 80 or gases, as shown for the first and fourth accumulators 160*a* and 160*d*. The operating cycle is also being repeated in the second and third cylinders 90*b* and 90*c*. This can happen asynchronously or together with the other pair. Also different pairs of cylinders 90 can be paired for an operating cycle, even if not adjacent. The operating cycle timing is what determines which cylinders 90 are paired.

FIGS. 12-14C illustrate another embodiment of a turbine housing 350 with a shared channel 353 wherein a squeegee plunger 198 provides a barrier to the flow of fluid 80 such that the fluid 80 will be forced to exit out of an adjacent turbine outlet 154 rather than continuing around the channel 353 along with the rotating turbine impeller (e.g., an alternate fixed-vane impeller 340'). The alternate fixed-vane impeller 340' shown in FIG. 12 has slanted fixed vanes 345' that extend substantially all the way outward to a sidewall 351 of the channel 353. Each of the slanted fixed vanes 345' has a relatively steep side 365 and a relatively slanted side 367 arranged such that the impeller 340' rotates the steep side 365 past the squeegee plunger 198 first before the slanted side 367 follows. The squeegee plunger 198 has a shaft 196 and a head 194 that is mostly wedge shaped except for a rounded outer end. The wedge shaped head 194 has a straight side and a slanted side which may also have a straight portion 195 at the shaft end of the head 194. A squeegee assembly 190 includes a housing 192 that has a cavity shaped to slidingly hold the squeegee plunger shaft 196 plus a plunger spring 142 for biasing the squeegee plunger outward from the housing 192. The squeegee housing 192 is attached (e.g., by bolts) to the turbine housing 350 over a hole 188 in the housing 350 that is also shaped to slidingly hold the squeegee plunger shaft 196 as well as a portion of the squeegee head 194. Although only one squeegee assembly 190 is illustrated in FIG. 12, there is one squeegee assembly 190 located between each turbine outlet/inlet pair 154/155. As in the other turbine housing embodiments 150, 250 discussed hereinabove, a turbine outlet 154 leading to a given cylinder 90 immediately precedes a turbine inlet 153 from the same cylinder 90. In operation then, the fixed vane impeller 340' rotates counterclockwise in reaction to the force of the fluid 80 that has been input into the channel 353 and is exiting through the outlet 154. As the impeller 340' moves the fixed vane 345' past the spring biased squeegee head 194, the head 194 will follow the shape of the fixed vane 345', first dropping down along the steep side 365 and then rising again as it follows along the slanted side 367. Thus the squeegee head 194 will effectively "squeegee" the fluid 80 out of the space between impeller vanes 345', thereby causing the fluid 80 to exit the channel 353 through the adjacent turbine outlet 154. On the other side of the squeegee head 194, the space between impeller vanes 345' is resultantly empty of fluid 80 and therefore ready to accept fluid input through the turbine inlet 155. It should be apparent that the hereindisclosed operating principles of a spring biased squeegee head (e.g., 194) in conjunction with a fixed vane impeller (e.g., 340') rotating in a shared channel turbine housing (e.g., 350) are applicable in a variety of embodiments and are not dependent, for example, on the shape of the impeller vanes (e.g., 345') or on the shape of the squeegee head (e.g., 194).

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A fluid piston engine comprising:
   a plurality of combustion cylinders, each having an inlet tube and an outlet tube;
   one turbine comprising a single disk shaped impeller with a vane extending outward relative to the axial center of the disk, the impeller being rotatably mounted in a turbine housing;
   a channel inside of the turbine housing positioned for providing a fluid flow path around the radial periphery of the impeller; and
   a daisy chain connection of the cylinders and the turbine such that a closed fluid flow path exists from the channel through a first inlet tube in to a first cylinder, then out from the first cylinder to the channel through a first outlet tube, then through a portion of the channel and out from the channel through a next, i.e., second inlet tube in to a second cylinder, then out from the second cylinder to the channel through a second outlet tube, then through a portion of the channel and out from the channel through a next inlet tube, the fluid flow path being a daisy chain from the first inlet tube all the way around until the next inlet tube is the first inlet tube.

2. The fluid piston engine of claim 1, wherein the channel further comprises:
   a plurality of lobe shaped channel portions, one channel portion per cylinder, such that a first channel portion provides the fluid flow path through the channel from the first outlet tube to the second inlet tube, and a second channel portion provides the fluid flow path through the channel from the second outlet tube to the next inlet tube; and wherein:
   the vane is spring biased outward for passing through the plurality of channel portions in sequence as the impeller rotates.

3. The fluid piston engine of claim 1, further comprising:
   a squeegee in the turbine housing that is spring biased radially inward; and
   positioning of the squeegee between the inlet tube and the outlet tube of a cylinder, thereby determining a boundary between two sequential channel portions.

4. The fluid piston engine of claim 1, further comprising:
   an accumulator connected to the fluid flow path, wherein the accumulator comprises:
   a gas containing chamber, and a relief valve connected to the chamber.

5. The fluid piston engine of claim 4, further comprising:
   a pressure or fluid level sensor connected to the accumulator for measuring the contents therein.

6. The fluid piston engine of claim 4, wherein:
   the accumulator is connected to an inlet tube; and
   an accumulator shutoff valve controls fluid flow into the accumulator.

7. The fluid piston engine of claim 6, further comprising:
   a first shutoff valve in the inlet tube between the turbine and the accumulator;
   a second shutoff valve in the inlet tube between the accumulator and the cylinder; and
   a third shutoff valve in the outlet tube.

8. The fluid piston engine of claim 7, wherein:
   the first shutoff valve is positioned in the connection between the inlet tube and the accumulator.

9. The fluid piston engine of claim 7, wherein:
   any of the first shutoff valve, the second shutoff valve and the third shutoff valve are flow control shutoff valves.

10. The fluid piston engine of claim 1, further comprising:
    a fluid level sensor on each one of the plurality of cylinders, arranged such that the fluid level sensor detects when the fluid reaches a predetermined level in the cylinder.

11. The fluid piston engine of claim 1, further comprising:
    a combustion gas inlet into each one of the plurality of cylinders; wherein the only outlet from each one of the plurality of cylinders is the outlet tube.

12. A method of operating a fluid piston engine with a plurality of daisy chained cylinders "first" through "$n^{th}$", wherein the next cylinder after the $n^{th}$ cylinder is the first cylinder; the method comprising the steps of:
    using a fluid level sensor in the cylinder to trigger spark plug ignition of a combustion process within the cylinder;
    wherein the fluid level sensor in a first cylinder of the plurality of daisy chained cylinders triggers the combustion process in the first cylinder when the fluid level sensor in the first cylinder detects that fluid has reached a predetermined level in the first cylinder; and the combustion process in the first cylinder comprises the steps of:

closing a first cylinder inlet shutoff valve;

firing a spark plug in the first cylinder; and opening a first cylinder outlet shutoff valve;

and further steps of the method after the sensor in the first cylinder detects that fluid has reached a predetermined level in the first cylinder comprise the steps of:

for a second cylinder of the plurality of daisy chained cylinders:

closing a second cylinder outlet shutoff valve;

opening second cylinder fuel and oxidizer inlet valves for a controlled injection time and then closing them;

opening a second cylinder inlet shutoff valve; and when the fluid level sensor in the second cylinder detects that fluid has reached a predetermined level in the second cylinder repeating the above method steps starting with triggering the combustion process in the second cylinder and so on, as if the second cylinder has become the "first cylinder" of the method steps, and as if a next one of the plurality of cylinders has become the "second cylinder" of the method steps.

13. The method of claim 12, further comprising the step of: opening an accumulator chamber for pressurized filling before the step of opening the second cylinder inlet shutoff valve.

14. The method of claim 12, further comprising the steps of:

idling a selected cylinder of the plurality of daisy chained cylinders by omitting for the selected idle cylinder all of the method steps of claim 12;

determining which one of the plurality of daisy chained cylinders is will be the second cylinder by implementing in the selected second cylinder the "second cylinder" method steps of: closing the second cylinder outlet shutoff valve, opening the second cylinder fuel and oxidizer inlet valves for a controlled injection time and then closing them, opening the second cylinder inlet shutoff valve, and using the fluid level sensor in the second cylinder to trigger the combustion process in the second cylinder;

varying engine performance by selecting from the plurality of daisy chained cylinders one or more pairs of sequentially operating first and second cylinders, while idling any remaining ones of the plurality of daisy chained cylinders; and further varying engine performance by varying the timing of the method steps in each pair of sequentially operating first and second cylinders relative to each other pair of sequentially operating first and second cylinders.

15. The method of claim 12, further comprising the step of:

controlling fluid flow rates for regulating engine speed.

16. The method of claim 12, further comprising the step of:

venting combustion byproducts through a pressure relief valve that is connected to a point in the daisy chain fluid flow path such that the point is between two daisy chained cylinders.

17. A fluid piston engine comprising:

a plurality of daisy chained cylinders wherein:

a piston comprises water that flows in a daisy chain from cylinder to cylinder;

the cylinders each have four valve-controlled openings consisting of a cylinder fluid inlet, a cylinder fluid outlet, a cylinder fuel inlet, and a cylinder oxidizer inlet; and the fuel is hydrogen, and the oxidizer is oxygen.

18. The fluid piston engine of claim 17 wherein:

the cylinder fuel inlet and the cylinder oxidizer inlet are combined, thereby limiting each cylinder to only three valve-controlled openings consisting of a cylinder fluid inlet, a cylinder fluid outlet, and a premixed fuel/oxidizer cylinder inlet.

* * * * *